1/22/85 XR 4,495,497

United States Patent [19]

Molnár

[11] Patent Number: 4,495,497

[45] Date of Patent: Jan. 22, 1985

[54] CIRCUIT ARRANGEMENT FOR CONTROLLED INTERCONNECTION OF SIGNAL SOURCES AND SIGNAL DESTINATIONS

[75] Inventor: Kálmán Molnár, Munich, Fed. Rep. of Germany

[73] Assignee: National Semiconductor Corporation, Santa Clara, Calif.

[21] Appl. No.: 337,895

[22] Filed: Jan. 7, 1982

[51] Int. Cl.[3] ........................ H04Q 9/00; G08C 15/06

[52] U.S. Cl. ........................... 340/825.63; 340/870.13

[58] Field of Search ...................... 340/825.52, 825.54, 340/825.63, 870.11, 870.13, 870.15, 505, 510; 370/113, 85

[56] References Cited

U.S. PATENT DOCUMENTS

| | | | |
|---|---|---|---|
| 3,601,543 | 8/1971 | Maniere | 340/870.13 |
| 3,872,437 | 3/1975 | Cross | 340/825.63 |
| 3,876,997 | 4/1975 | Farley et al. | 340/870.13 |
| 3,986,169 | 10/1976 | Kobayashi et al. | 340/825.52 |
| 4,146,750 | 3/1979 | Spiesman | 340/870.13 |
| 4,156,112 | 5/1979 | Moreland | 370/85 |
| 4,399,440 | 8/1983 | Douglas | 340/870.11 |

*Primary Examiner*—Donald J. Yusko
*Attorney, Agent, or Firm*—Gail W. Woodward; Paul J. Winters; Michael J. Pollock

[57] ABSTRACT

A data transmission system for individually sensing a plurality of remote signal sources and interconnecting the selected signal source with one or more signal destinations by switch means at each signal source and at each signal destination.

7 Claims, 15 Drawing Figures

CIRCUIT ARRANGEMENT FOR CONTROLLED INTERCONNECTION OF SIGNAL SOURCES AND SIGNAL DESTINATIONS

BACKGROUND OF THE INVENTION

It is well-known that the costs of cabling becomes more and more significant in instrumentation and allied fields. While the costs of signal processing have fallen drastically with the introduction of large scale integrated circuits, the expenses for cabling have not changed too much.

There are several systems known in the art for reducing costs in the case of the digital signal transmission by using standardised interfaces and link systems. However, no similar solution exists for analog signals. Of course, digital transmission can also be used for transmitting of analog messages by using an A-to-D converter at the sending point and D-to-A converter at the destination point. But this method needs additional components and introduces additional conversion errors.

For analog signals, connection methods are still in use, e.g., point-to-point connections, which are very wasteful. Especially in the analog data acquisition field, the costs for the wiring are very high, because between each analog sensor and the corresponding multiplexer input of the central data acquisition unit, individual connections are used. The number of the sensors can be several hundred.

A dominating percentage of sensors, like strain gage and other bridges or resistance temperature detectors, need excitation, which causes additional wiring costs. Moreover, for high accuracy measurement the excitation is regulated. This needs additional sense feedback wires from the bridge to the excitation unit to avoid error through the excitation wire resistance. If the excited sensors are not mounted closely enough together, then even more regulated excitation units with additional wires should be used, namely one separate excitation unit for each sensor group.

SUMMARY OF THE INVENTION

The present invention includes: source/destination switching devices, control signal switching devices, control signal generators, and a source/destination/control interconnection, to which the source/destination switching devices and the control signal switching devices are connected.

The following abbreviations are employed in the present specification:

"s/d" switching device (source/destination switching device)

"c" switching device (control signal switching device)

"s/d/c" interconnection (source/destination/control interconnection)

The "s/d" switching devices connect analog or digital type sources and destinations to the "s/d/c" interconnection. Any number of "s/d" switching devices may be employed.

The "c" switching devices connect control signal generators to the "s/d/c" interconnection. Any number of "c" switching devices may be employed.

The control signal generators generate the control signals. These control signals select and activate (switch on) or deactivate (switch off) the "s/d" switching devices. The number of control signal generators is not restricted by the invention. If there is more than one control signal generator, only one is allowed to function at a time. The control signal generator may be a microprocessor, a hard-wired digital or analog electronic circuit, or a combination of these.

The "s/d/c" interconnection interconnects the sources and destinations through the "s/d" switching devices. It also connects the control signal generators through the "c" switching devices to the receivers of the "s/d" switching devices. The number of wires in the "s/d/c" interconnection is not restricted by the invention. In the simplest case it is only one wire, to which all switching devices are connected, and one return. But the "s/d/c" interconnection can also consist of more wires without returns, or with one or more returns. Each of the wires (including returns) of the "s/d/c" interconnection can serve either as a common connection for source-to-destination and for the control signals, or as a connection only for source-to-destination, or as a connection only for the control signals. For example, in the most general case, some of the wires are connections only for source-to-destination, other wires only for the control signals, and still other wires for both. The number of wires of each type is independent of each other and not restricted by the invention.

First, the "c" switching device connects the control signal generator to the "s/d/c" interconnection. Then the control signal generator sends control messages to the "s/d" switching devices and the required "s/d" switching devices will be activated. Thereafter, the "c" switching device disconnects the control signal generator from the "s/d/c" interconnection. Through the activated "s/d" switching devices and through the "s/d/c" interconnection, an analog type link between the selected source and destination(s) comes into being. In the next cycle, the control signal generator activates other "s/d" switching devices making a new analog type link, and so on.

DETAILED DESCRIPTION OF THE INVENTION

Figure 1:
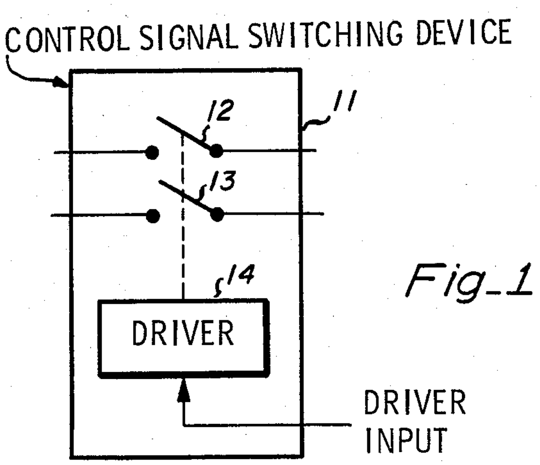
FIG. 1 is schematic drawing of a control switching device.

FIG. 1 is a schematic representation of an embodiment of "c" switching device 11, with two ganged switches 12 and 13. However, the number of switches is not restricted by the invention. The switches may be solid-state switches or relays. The switches controlled by driver 14, connect the control signal generator to the "s/d/c" interconnection.

Figure 2:
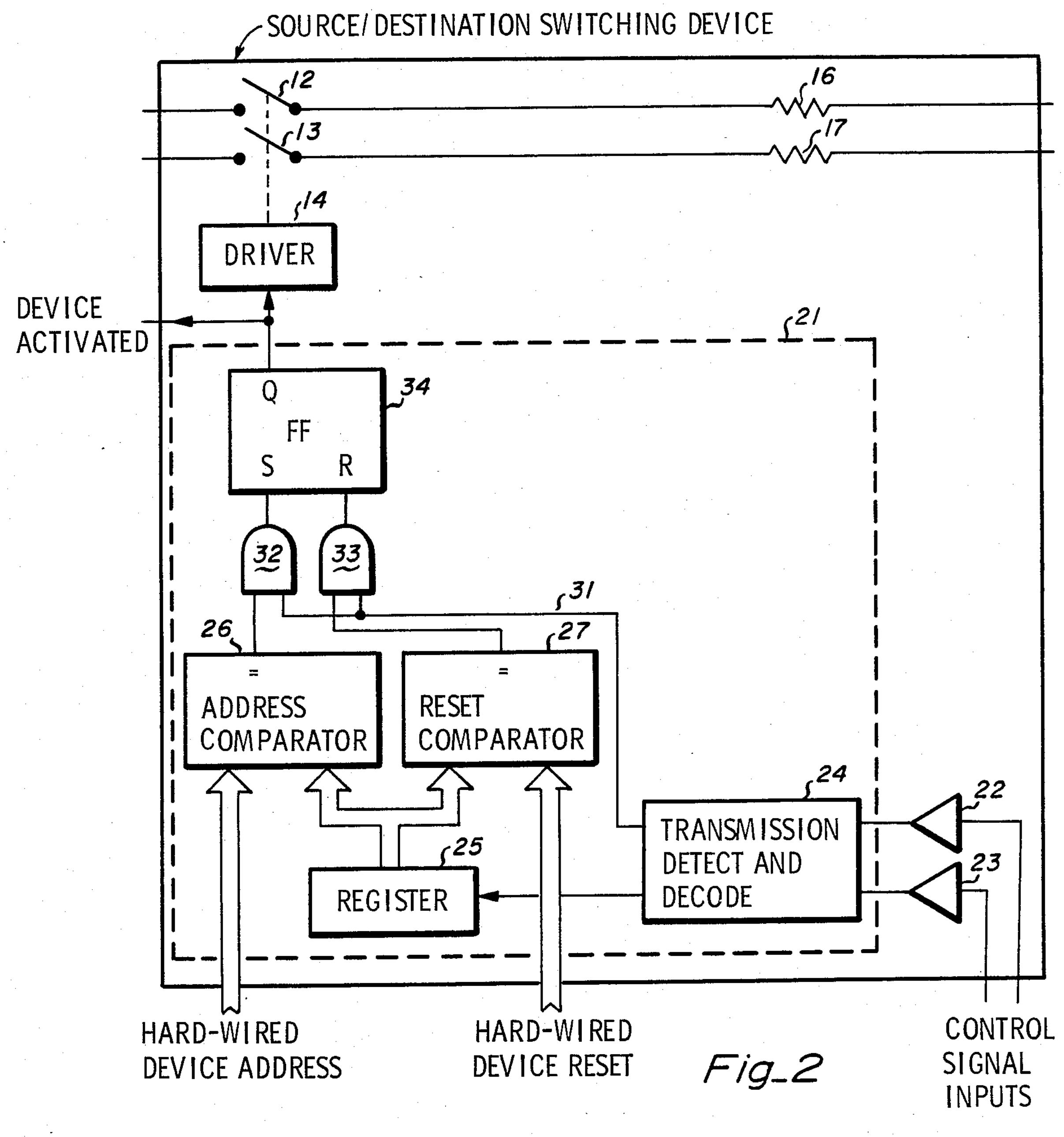
FIG. 2 is a schematic drawing of a source/destination switching device.

FIG. 2 is a schematic representation of the "s/d" switching device 15, with two switches 12 and 13 as an example. Also in this case, the number of switches is not restricted by the invention. The switches are either solid-state switches or relays. The switches 12 and 13 connect the source or destination to the "s/d/c" interconnection. FIG. 2 also shows resistors 16 and 17 in series with the switches. These resistors may be separate resistors, but they can also be the inherent internal resistances of the switches (in case of solid-state switches) if these are high enough. The task of these resistors will be later explained on the basis of the complete circuit shown in FIG. 4.

As FIG. 2 shows, the driver is controlled by the output of receiver 21. This output also serves as a "device activated" (DA) output indicating that the "s/d" switching device 15 is on. If there is no need for indicating that the device is on, then the "device activated" output can be omitted. The input signal to the receiver is the control signal sent by a control signal generator. The input wires of the receiver 21 are equipped with high input resistance and low input current buffers 22 and 23. These buffers are only needed if the receiver is connected to such wires of the "s/d/c/" interconnection, which serve both for source-to-destination connection and for control signals. By the aid of the buffers 22 and 23, the receiver 21 will not load the wires. The number of input wires and corresponding buffers shown in FIG. 2 is two, but this number is not restricted by the invention.

As shown in FIG. 2, an incoming serial digital signal goes to the transmission to detect and decode unit 24 which detects that it is a control signal and decodes it. The decoded bits will be then shifted serially into register 25. The content of register 25 is then compared with the hard-wired device address and device reset. The comparisons are made by two digital parallel input comparators, an address comparator 26 and a reset comparator 27. After receiving the last bit the control signal received detect line 31 goes high and enables the two AND-gates, 32 and 33. Depending on the outputs of the comparators 26 and 27, the flip-flop 34 will be either set or reset, or, if the message is destinated for other devices, remain unchanged.

The receiver shown in FIG. 2 assumes serial digital control signals. The receiver should be able to recognize the control signal and separate it from a source signal. This recognition is made by the transmission detect and decode unit 24 with the well-known methods used in digital signal transmission. A very simple separation method could be used if the source signals are restricted to the +5 V . . . −5 V range, which is commonly used, and the control signal has the high/low level of +10 V/0 V. This level separation is not needed (in general, the control signal recognition will be more simple) if the receiver is connected to wires of the "s/d/c" interconnection which serve only for control signals, i.e., the wires for the source-to-destination signals and the wires for the control signals are separated.

It is important to mention that the way of realization of the receiver can also be other than shown. For example, the receiver can work with parallel digital control signals, or, because the "s/d/c" interconnection is a link suitable also for analog signals, even with analog control signals. Generally, the receiver 21 is a device which recognizes a control signal sent by the control signal generator and interprets it. Then, corresponding to the message, the receiver 21 activates or deactivates the driver 14 for closing or opening the switches 12 and 13.

Figure 3:
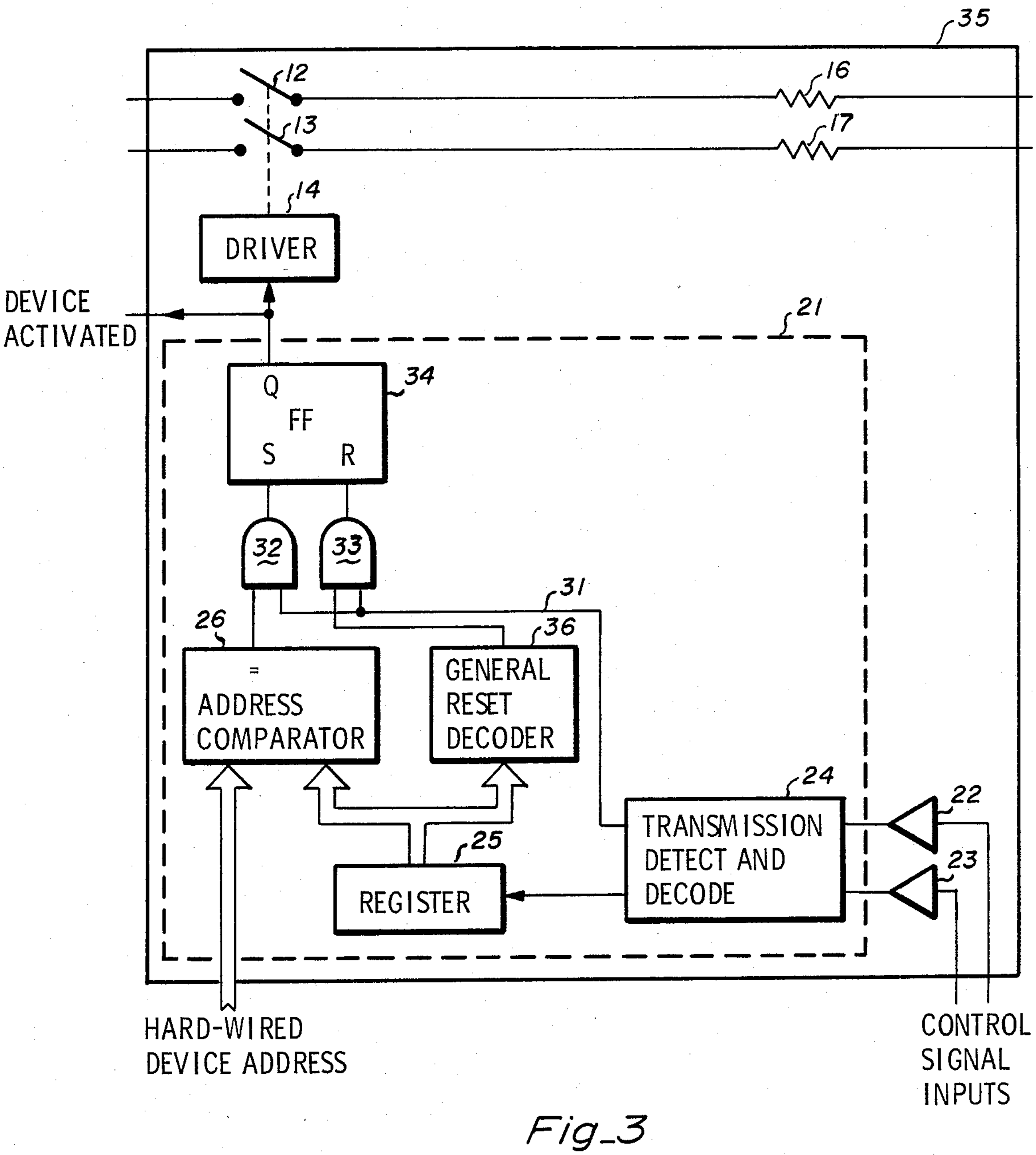
FIG. 3 illustrates another embodiment of the source/destination switching device.

FIG. 3 shows an alternative source/destination switching device 35, where the reset message is identical for all devices and this messsage is recognized by a simple general reset decoder 36.

Figure 4A:
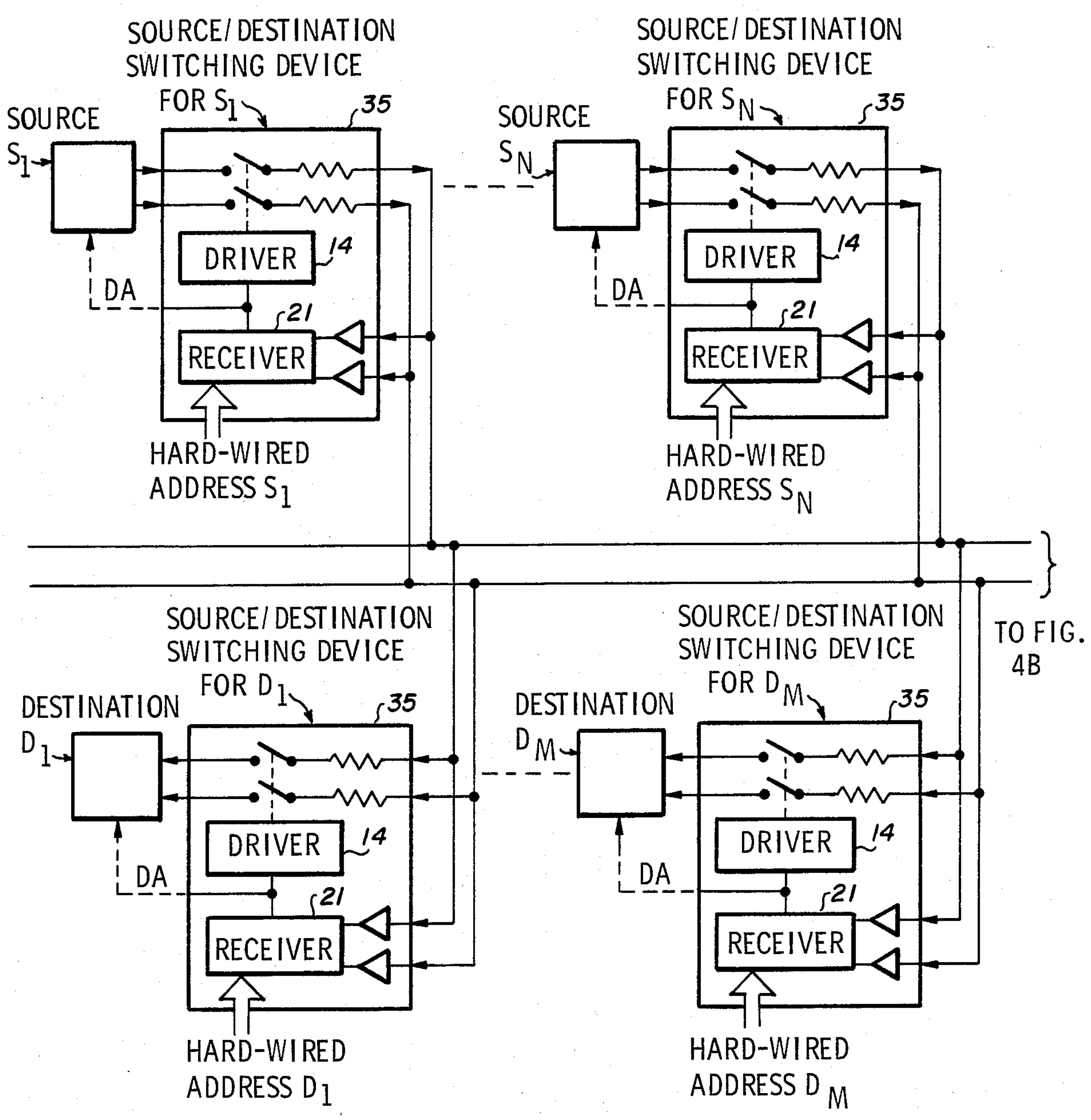
FIGS. 4A and B illustrate a two-wire interconnection embodiment of the present invention.
Figure 4B:
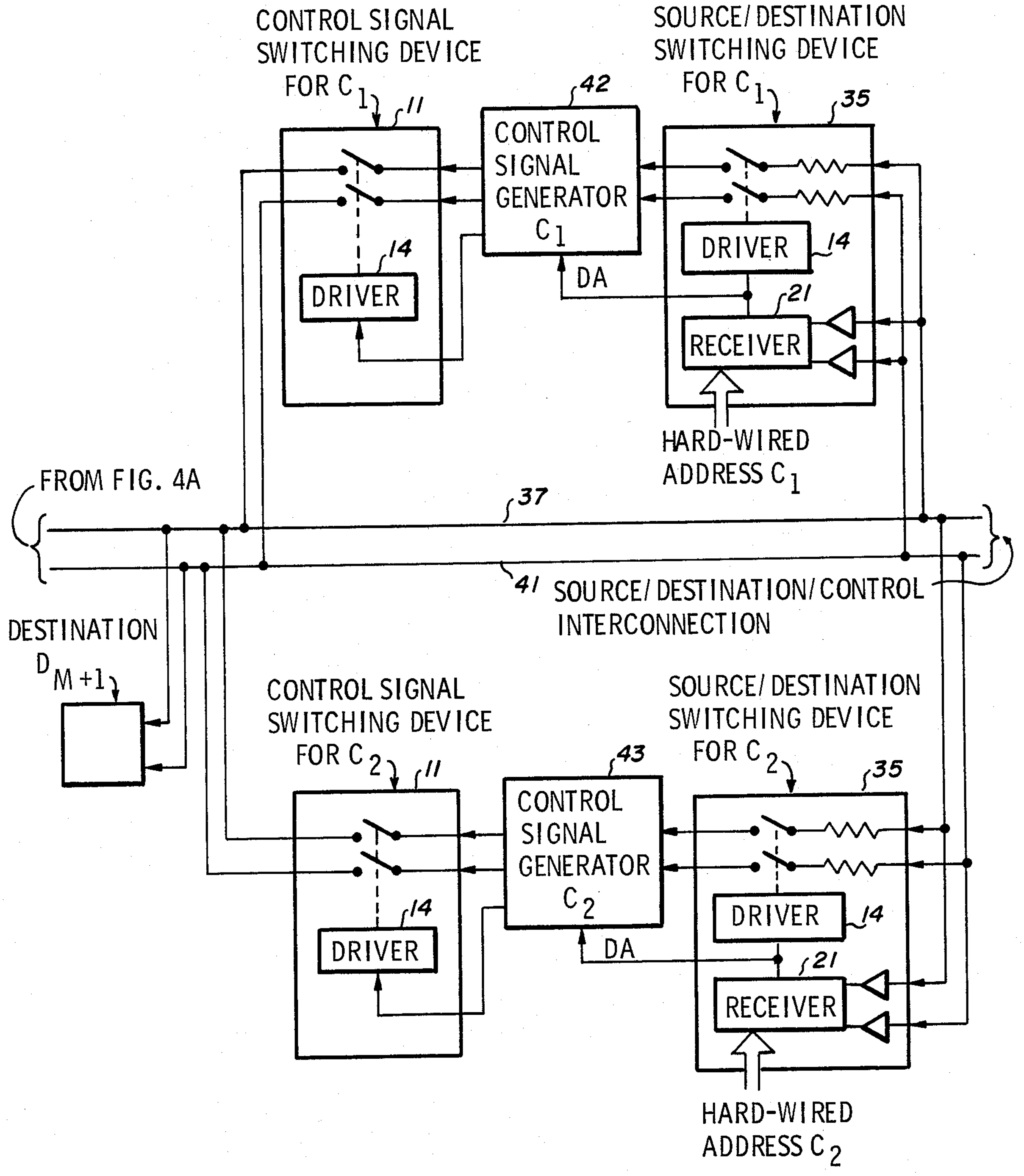

FIG. 4 is a possible embodiment of the invention. As illustrated in FIG. 4, the "s/d/c" interconnection consists of two wires 37 and 41. These wires serve both for source-to-destination connection and for the control signals. To the "s/d/c" interconnection are connected two "c" switching devices 11 for connecting the outputs of the control signal generators 42 and 43, and N+M+2 "s/d" switching devices 35 for connecting the sources $S_1 \ldots S_N$, the destinations $D_1 \ldots D_M$ and the inputs of the two control signal generators 42 and 43. All "s/d" switching devices are as shown in FIG. 3.

The destination $D_{M+1}$, exemplarily an alarm monitor or signal recorder, is always switched on, and therefore, a corresponding "s/d" switching device 35 is not needed.

The source and destinations may be different analog and/or digital devices. Because of the resistors 16 and 17 connected in series with the switches of the "s/d" switching devices 35, the destinations should have a high enough input resistance to avoid error caused by voltage drop. This is usually guaranteed by the use of input buffers in the destination. These can be of the type commonly used in electrically multiplexed systems.

The control signal generator 42 and 43 can be any device able to send control signals, like a microprocessor or a hard-wired circuit.

Figure 5:
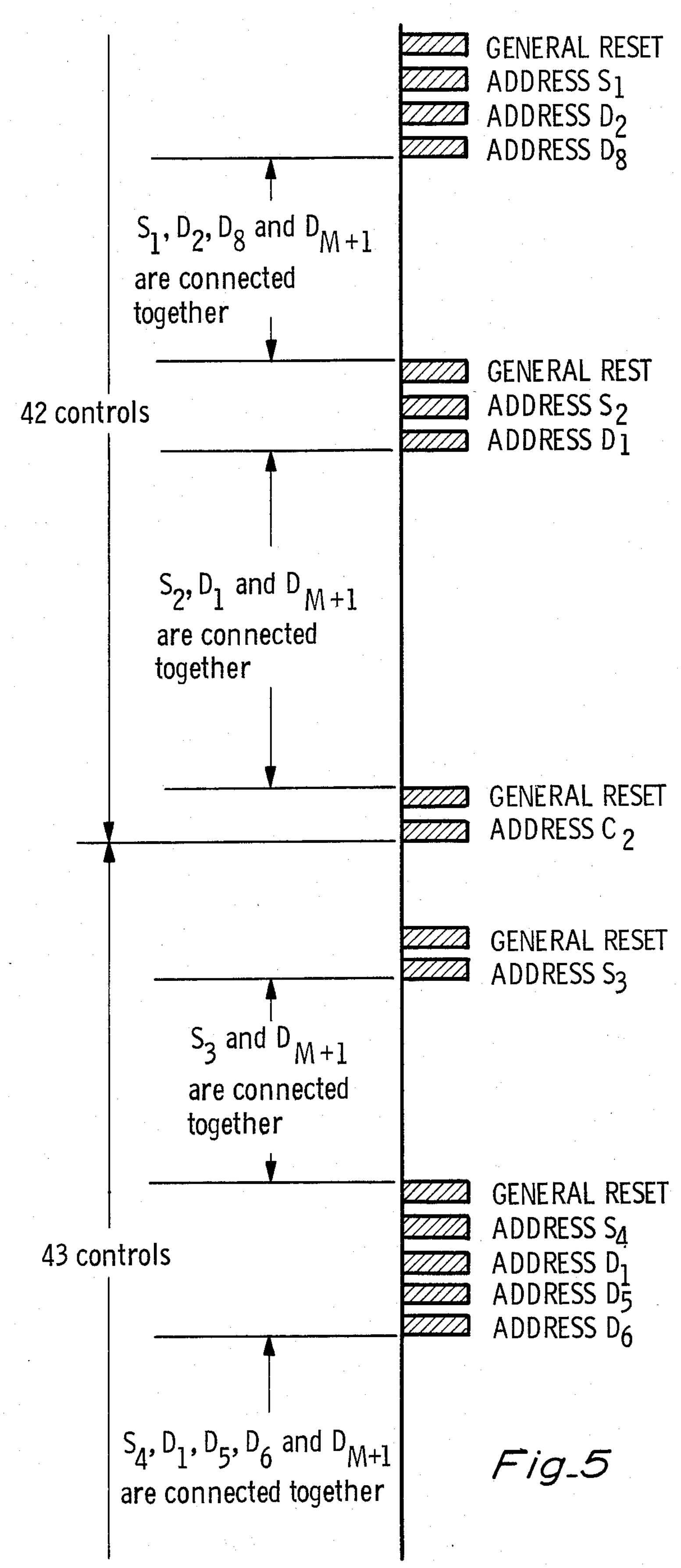
FIG. 5 is a timing diagram illustrating the operation of the embodiment of FIG. 4.

The mode of operation of the circuit arrangement shown in FIG. 4 will be described on the basis of the timing diagram, shown in FIG. 5, which is a possible example for an event sequence. The pulses in FIG. 5 represent the messages sent by one of the control signal generators. It will be assumed that, first, the control signal generator 42 is working. Before sending messages the generator 42 activates the driver of the "c" switching device 11 for 42, i.e., the switches of that will be closed and 42 is connected directly to the "s/d/c" interconnection 37 and 41. In the first cycle, the generator 42 sends first a general reset which deactivates all "s/d" switching devices 35, i.e., all switches of these open. The second message addresses the "s/d" device 35 for source $S_1$, i.e., $S_1$ will be connected to the "s/d/c" interconnection 37 and 41. The third and fourth messages address the destinations $D_2$ and $D_8$, i.e., $D_2$ and $D_8$ will also be connected to the "s/d/c" interconnection 37 and 41. After the fourth message, which is the last one in this cycle, the control signal generator 42 deactivates the driver of the "c" switching device 11 for 42, whereby the switches of this open and the generator 42 is disconnected from the "s/d/c" interconnection 37 and 41. Now, the source $S_1$ and the destinations $D_2$, $D_8$ and $D_{M+1}$ are connected together.

FIG. 4 shows that the "s/d" switching devices 35 have resistors 16 and 17 in series with the switches. These resistors have the task to avert a short of the control signal generator and to assure that the control signal dominates when at the same time also a source is switched to the "s/d/c" interconnection 37 and 41. For example, in the above described cycle where $S_1$, $D_2$ and $D_8$ were addressed, the switches of the "s/d" switching device 35 for $S_1$ are already on, when the control signal generator 42 is sending the address for $D_2$. That is, the control signal from 42 goes also to $S_1$. Because sources have often very low resistance, without the resistors 16 and 17, a short would occur for 42. Similar is the situation when $D_8$ is addressed. At this time, the source $S_1$ and the destination $D_2$ are already switched on. Also similar is the situation by each general reset when one of the sources and one or more of the destinations selected in the previous cycle are in the first moment still on. It is obvious that sources can cause a short for the control signal because of their low resistance. If destinations have high input resistance, as usual, these will cause no problems. However, there are some types of destinations, like a simple relay or a simple digital device or a destination for current signals, which have relatively low input resistance. Because of that, the resistors 16 and 17 in series with the switches are also useful in the "s/d" switching devices 35 used for destinations.

Another reason for using the resistors 16 and 17 is to protect the sources and destinations from damage, which eventually could be caused by the control signal.

It is obvious that for sources and destinations with enough high resistance and by no danger for damage, an alternative of the "s/d" switching device 35 can be used, where the resistors 16 and 17 in series with the switches are left out.

As FIG. 4 shows with broken lines, the device activated outputs (DA) of the "s/d" switching devices can also be connected to the corresponding sources and destinations. These digital outputs are identical with the driver inputs and indicate that the devices are on. The signal DA can be used, for example, to initiate a source or as a strobe signal for destinations furnished with A-to-D converters.

The connection between $S_1$, $D_2$, $D_8$ and $D_{M+1}$, activated in the first cycle (FIG. 5), will exist until the next general reset. As FIG. 5 shows, the second cycle is initiated again with a general reset message, then source $S_2$ and destination $D_1$ are addressed by the control signal generator 42. Hereby, in this cycle $S_1$, $D_1$ and $D_{M+1}$ are connected together through the "s/d/c" interconnection 37 and 41.

In the next cycle shown in FIG. 5, the control signal generator 42 transfers the controlling function to the control signal generator 43. This cycle is initiated again with a general reset, then the "s/d" switching device 35 for $C_2$ is addressed and the input of $C_2$ will be connected to the "s/d/c" interconnection 37 and 41. (In this case, the input of $C_2$ is actually a destination.) Now, there are several possibilities for transferring the controlling function to $C_2$. The device activated (DA) output of the "s/d" switching device 35 for $C_2$ indicates it directly for $C_2$. On the other hand, the control signal generator 42 can also send a much more complex message through the "s/d/c" interconnection 37 and 41, and the closed switches of the activated "s/d" switching device 35 for 43. A further possibility, not shown, is that 42 also addresses in this cycle a source. In this case, the control signal sent by 42 in this cycle would be GENERAL RESET, ADDRESS $C_2$, ADDRESS $S_K$. Here, $S_K$ is such a source which generates the complex message of the controlling function transfer and sends it through the "s/d/c" interconnection 37 and 41 to the input of 43. After the controlling function is transferred, the control signal generator 43 controls in the same manner as 42 did before. As FIG. 5 shows, in the fourth cycle $S_3$ and $D_{M+1}$, in the fifth cycle $S_4$, $D_1$, $D_5$, $D_6$ and $D_{M+1}$ are connected together.

Figure 6:
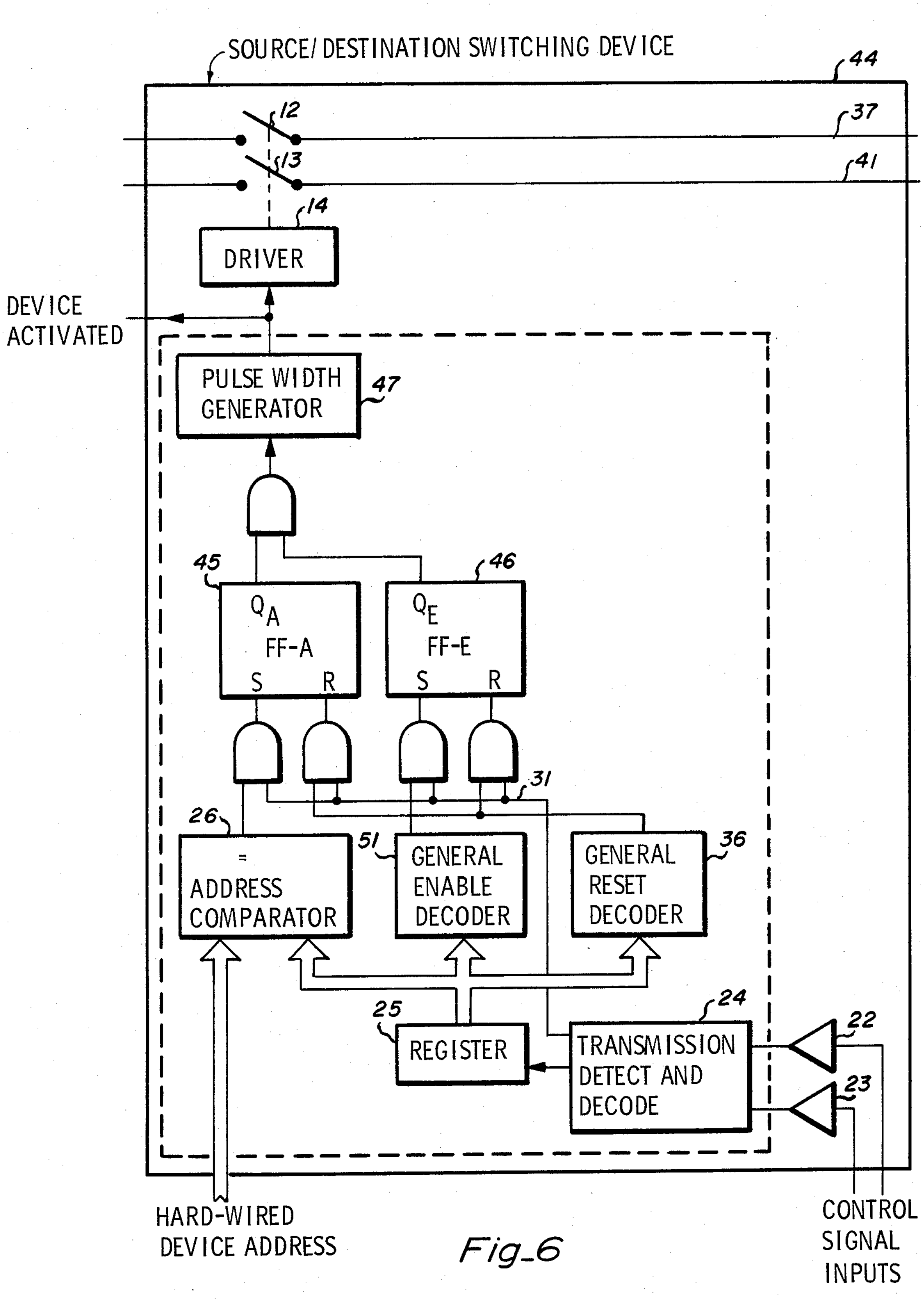
FIG. 6 illustrates another embodiment of the source/destination switching device.

FIG. 6 shows an alternative "s/d" switching device 44, where there are no resistors in series with switches 12 and 13. Such a configuration has the obvious benefit that any voltage drop caused by the resistors 16 and 17 is now eliminated. Consequently, the requirement for high input resistance destinations is less strong; furthermore, induced noise will cause less noise signal on the "s/d/c" interconnection. The circuit operates similarly to that shown in FIG. 3, but has some additional components. The general reset message activates general reset decoder 36 and sets the receiver in the starting condition, i.e., the outputs $Q_A$ and $Q_E$ of the flip-flops 45 and 46 will be low. When the "s/d" switching device 44 is addressed, the flip-flop 45 will be set, $Q_A$ will be high, but $Q_E$ still remains low. Only after all the intended "s/d" switching devices are addressed will the control signal generator send a general enable message to general enable decoder 51, which sets the flip-flop 46 of all "s/d" switching devices 44. Now, in all previously addressed "s/d" switching devices 44, there will be $Q_A$=high and $Q_E$=high, a condition which triggers the pulse width generator 47. In this moment, the switches 12 and 13 of the addressed "s/d" switching devices 44 close and connect the corresponding source and destinations to the "s/d/c" interconnection 37 and 41. The switches 12 and 13 remain on (closed) for the duration determined by the pulse width generator 47. Normally, the switch closing durations determined by the individual pulse width generator 47 of the "s/d" switching devices 44 are identical. If this switch closing duration is less than the time until the next general reset, then during sending the control signals none of the sources and destinations will be connected to the "s/d/c" interconnection 37 and 41, and therefore, no short or damage problem exists.

Figure 7:
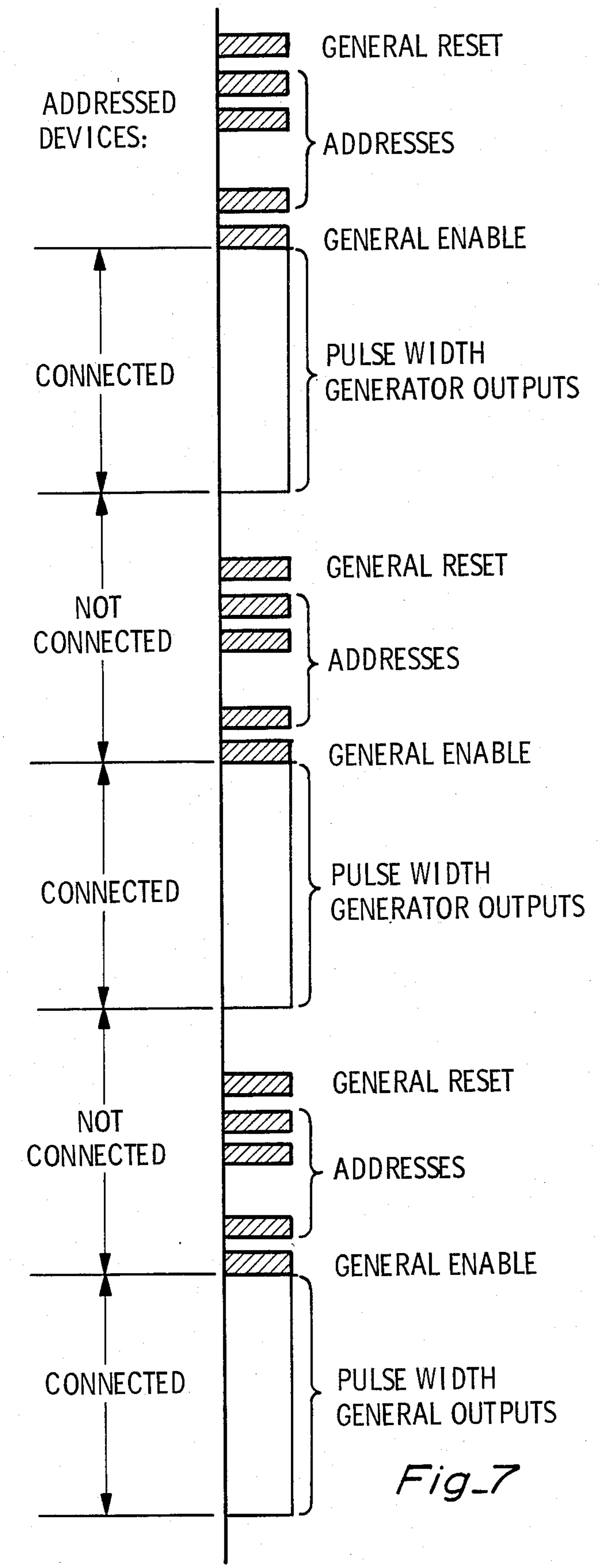
FIG. 7 is a timing diagram illustrating the operation of the embodiment of FIG. 6.

FIG. 7 shows the timing diagram by using "s/d" switching devices 44 according to FIG. 6. If needed the circuit shown in FIG. 6 can easily be modified to have individual enable, instead of general enable. However, in the above described and in most cases it will bring no more advantages. The modification needs only an addressed digital comparator, instead of the general enable decoder 51; a similar solution, as used for individual reset shown in FIG. 2. The inputs of this digital comparator would then consist of the output of the register and a hard-wired device enable code.

Figure 8:
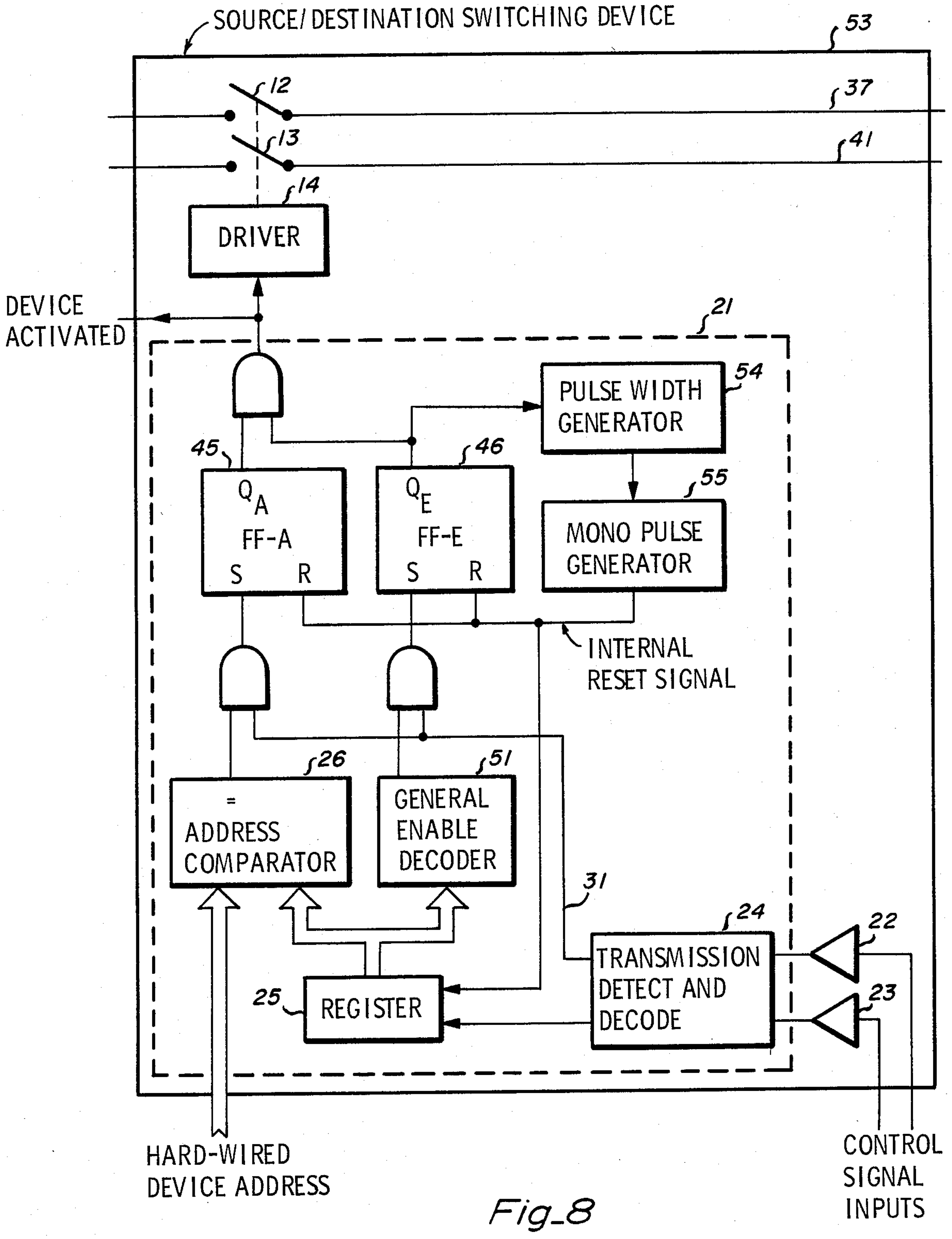
FIG. 8 illustrates an internal-reset embodiment of the source/destination switching device.

FIG. 8 shows a slightly changed alternative to FIG. 6 with internal reset. In this case, there is no need to send a general reset message. In this circuit the flip-flop 46, which is set in all "s/d" switching devices by the general enable message, starts the pulse width generator 54. When the pulse width generator 54 returns to its steady-state condition, it triggers the mono pulse generator 55 which generates the internal reset pulse signal.

Figure 9:
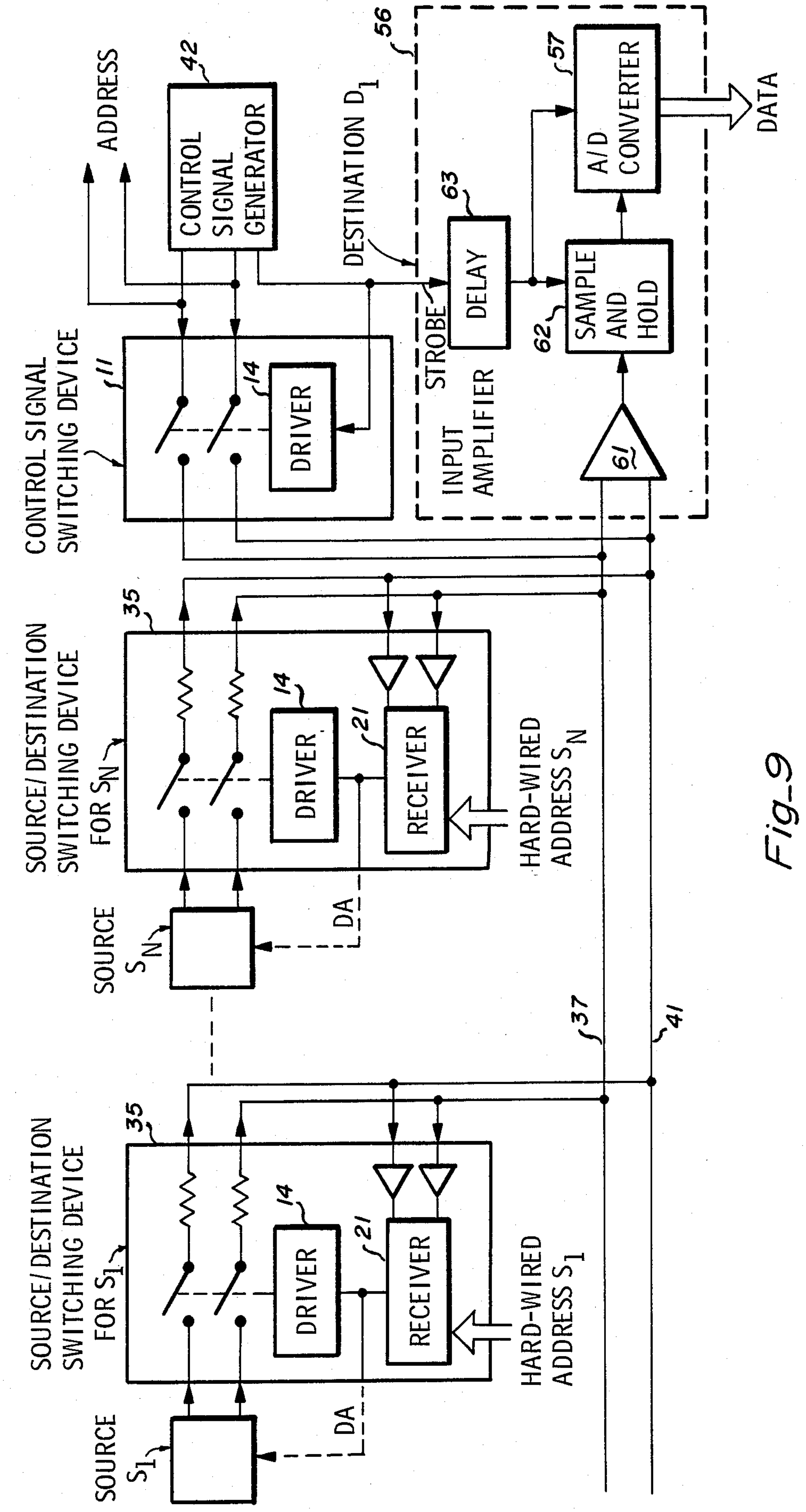
FIG. 9 is a schematic diagram illustrating a multiplexed embodiment of the present invention.

FIG. 9 shows the use of the invention for a multiplexed data acquisition system, which is one of the most important applications of the invention.

In the shown arrangement, the "s/d/c" interconnection is a two-wire, 37 and 41, balanced interconnection.

To this are connected N "s/d" switching devices exemplarily, 35, for connecting the sources $S_1 \ldots S_N$, one "c" switching device 11 for connecting the control signal generator 42 and one destination 56. Destination 56 is the signal processor with an A-to-D converter 57, which converts the selected source signal into digital form.

The control signal generator 42 addresses the desired source/destination switching device 35 in the desired sequence, connecting the desired analog source to lines 37 and 41. An input buffer amplifier 61 passes the analog signals to a sample and hold circuit 62. At the time control signal generator 42 addressed a source, a strobe pulse is applied to a delay 63. The delay is sufficient to enable the source signal at the input of the sample and hold circuit to have stabilized. The strobe pulse activates analog-to-digital converter 57, which digitizes the data from sample and hold circuit 62.

Source/destination switching devices of any type disclosed hereinabove can be used. But, because in data acquisition systems there is only one sensor selected at a time, a simpler alternative may be employed. In "s/d" switching device 35 disclosed hereinabove, the address message, which corresponds to the hard-wired device address, sets the flip-flop 34 and through that closes the switches. Any other address message resets the flip-flop 34, i.e., opens the switches. In this case there is no need for a reset or enable message, reset comparator 27, or general reset decoder 36.

It should be mentioned for completeness, that the "s/d" switching device 35 can also have a pulse width generator 47 connected between flip-flop 34 and the driver 14. The switches 12 and 13 will be closed only for the duration determined by the pulse width generator 47, and therefore, the resistors 16 and 17 may be omitted as in FIG. 6.

Figure 10A:
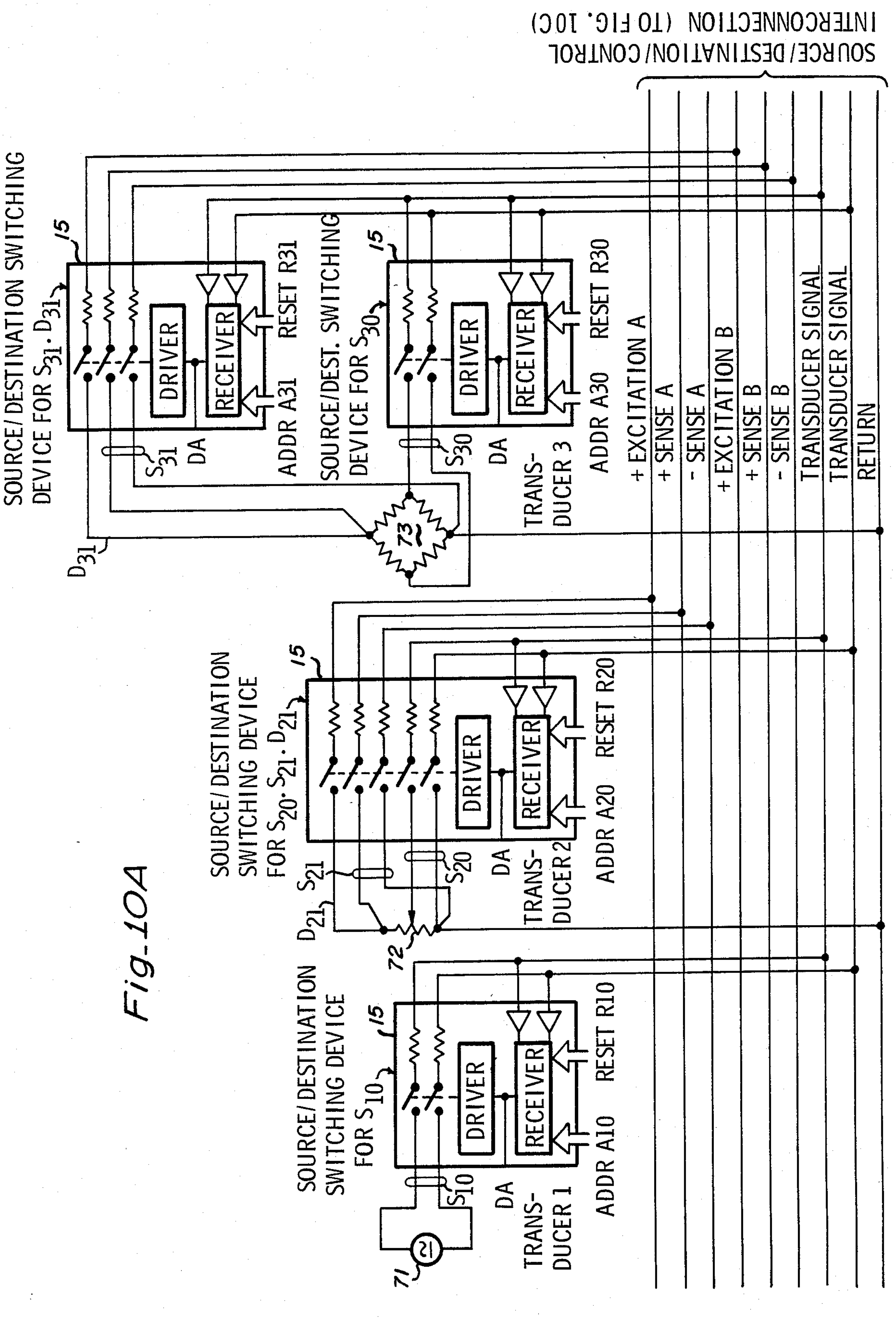
FIGS. 10A, B; C are schematic diagrams illustrating the present invention wherein excitation is provided to someone.
Figure 10B:
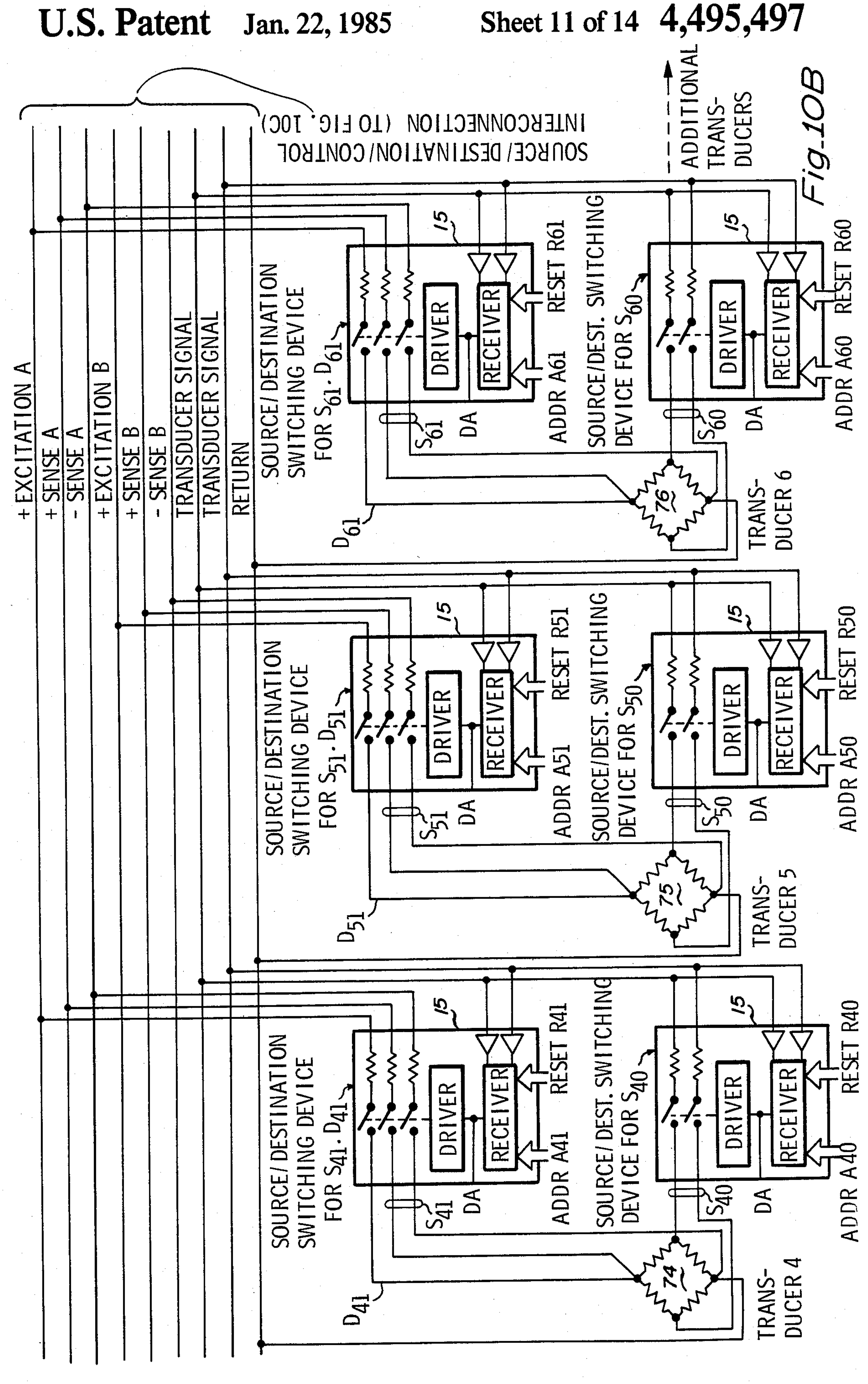
Figure 10C:
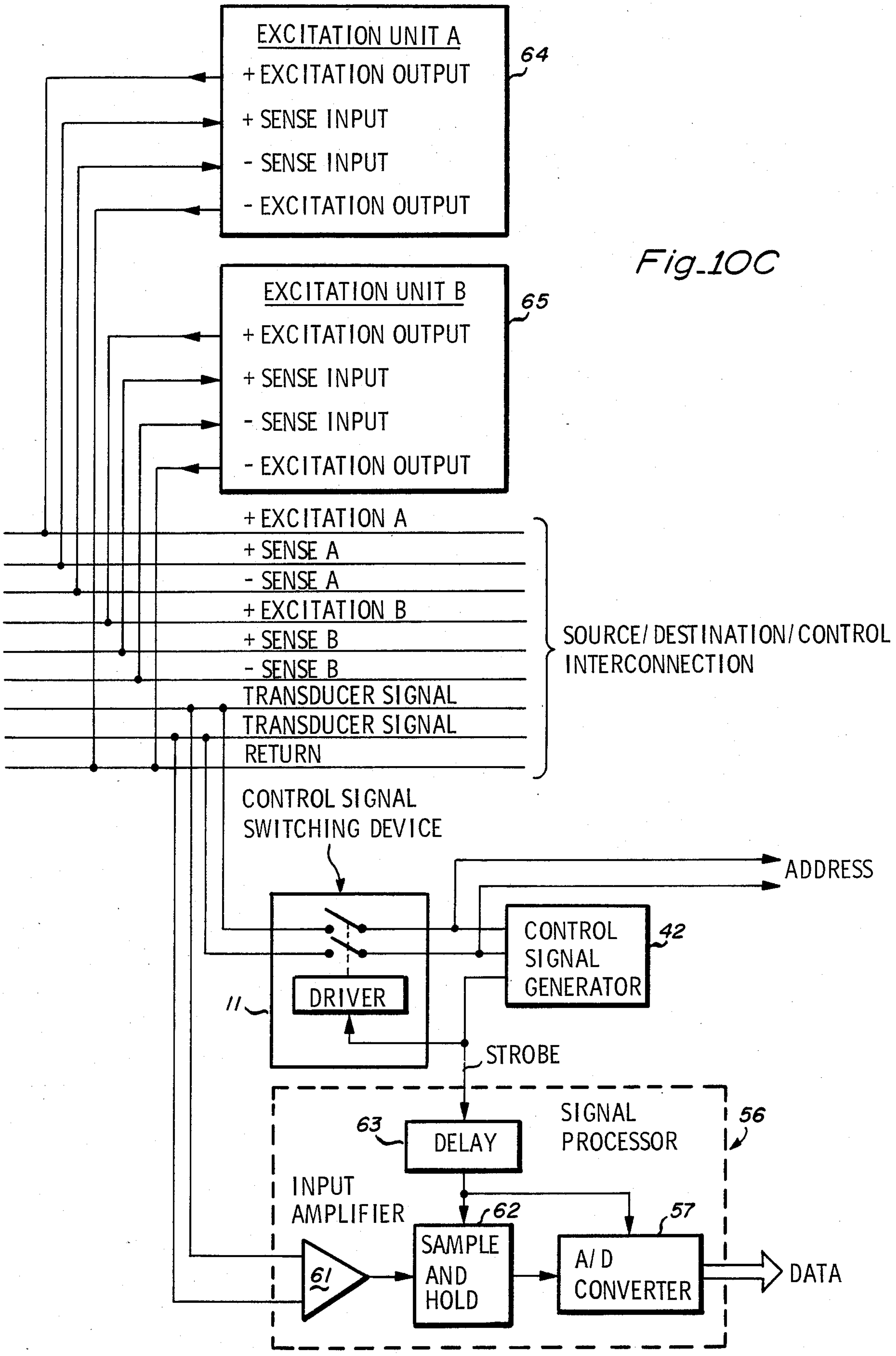

FIG. 10 shows a multi-wire data acquisition system in accordance with the present invention, wherein some of the sensors need excitation. This is a very frequent requirement in industrial measurement and FIG. 10 illustrates the advantages of the present invention in this case. FIG. 10 also illustrates the "s/d/c" interconnection with more wires and the "s/d" switching devices with more switches.

Figure 11:
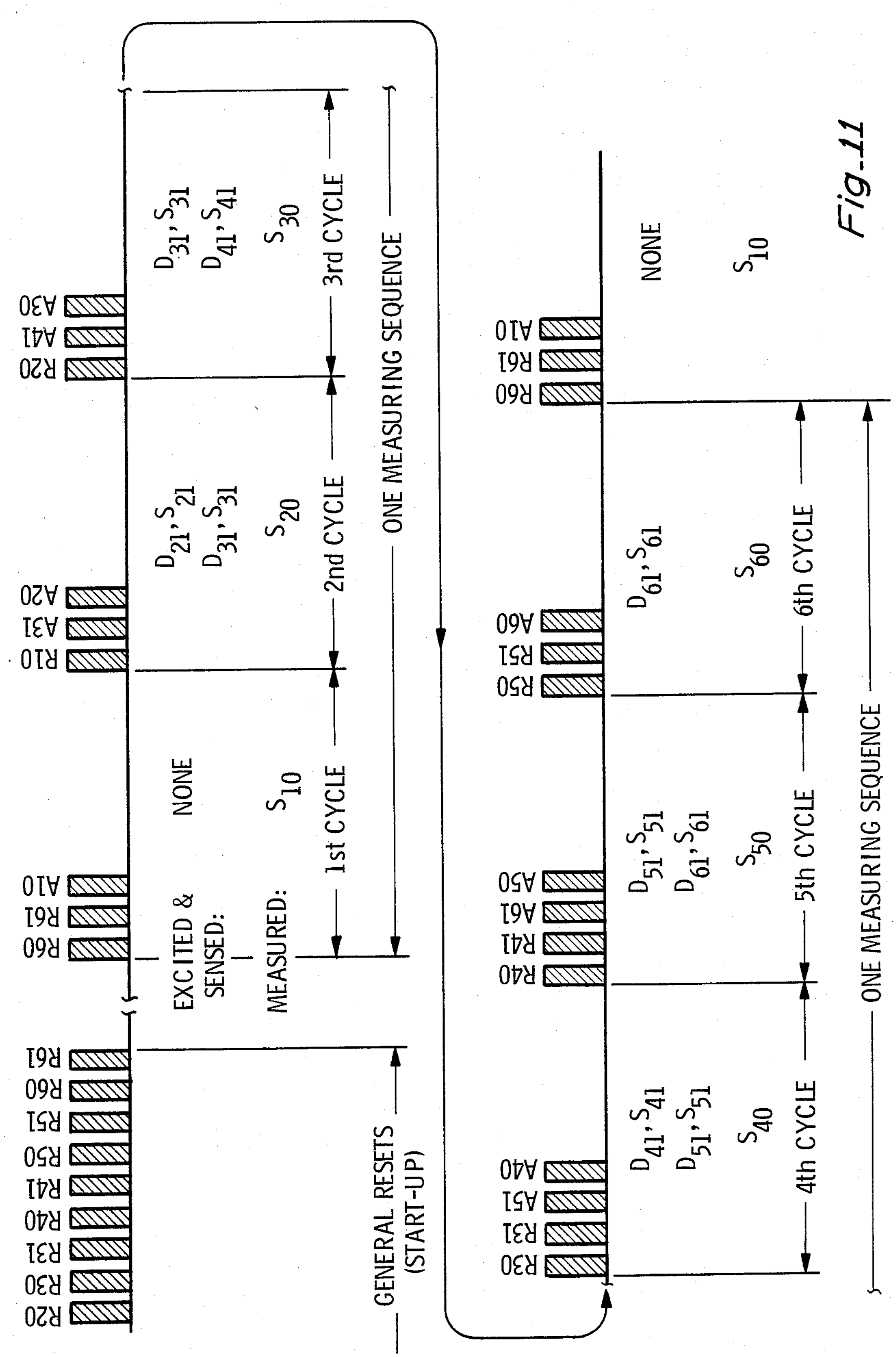
FIG. 11 is a timing diagram illustrating the operation of FIG. 10.

The "s/d" switching devices 15 may be of the type disclosed in FIG. 2. The transducer signals are marked $S_{10}$, $S_{20}$, $S_{30}$, $S_{40}$, $S_{50}$ and $S_{60}$. Transducer 71, producing signal $S_{10}$, needs no excitation input. Potentiometer 72 does need excitation which is marked as destination $D_{21}$ and the sense signal output of potentiometer 72 is marked as source $S_{21}$. It will be assumed that transducer 72 has no significant transient time. The other sensors 73–76 are bridges, where the excitation inputs of the bridges are marked as destinations $D_{31}$, $D_{41}$, $D_{51}$ and $D_{61}$, the sense signal outputs of the bridges as sources $S_{31}$, $S_{41}$, $S_{51}$ and $S_{61}$. It will be assumed that the bridges do not have a negligible transient when the excitation is switched on. To avoid the transient problem, there are two excitation units: one, for exciting a transducer just being measured; and the other, for exciting the transducer to be measured in the next cycle. FIG. 11 shows the timing of a measurement sequence. This begins with resetting all "s/d" switching devices 15. In the first cycle, transducer 71 ($S_{10}$) is measured, excitation not being required. In the second cycle, transducer 72 is excited and the excitation is sensed by excitation unit 64 and transducer 72 is measured. But also in the second cycle excitation unit 65 is switched to transducer 73 to excite it and to sense the excitation. During the second cycle, the excitation transient of transducer 73 will end. In the third cycle, transducer 73 is measured. The excitation of this transducer by excitation unit 65 has been switched in the previous cycle and now it is steady. Of course the excitation of transducer 73 remain switched on for the third cycle. Also in the third cycle, excitation unit 64 is switched to transducer 74 to excite it and to sense the excitation. Therefore, when transducer 74 is measured in the fourth cycle, the transient will be over. In following cycles the other transducers, which also need excitation, will be measured in the same manner.

As the above example shows there are only two excitation units needed for all transducers. The number of transducers shown is only six, but it can however be many and still only two excitation units will be necessary. Moreover, if the excitation transient is negligible at all transducers (as is often the case), then only one excitation unit is needed. It will then be switched to one after the other transducer.

Figure 12:
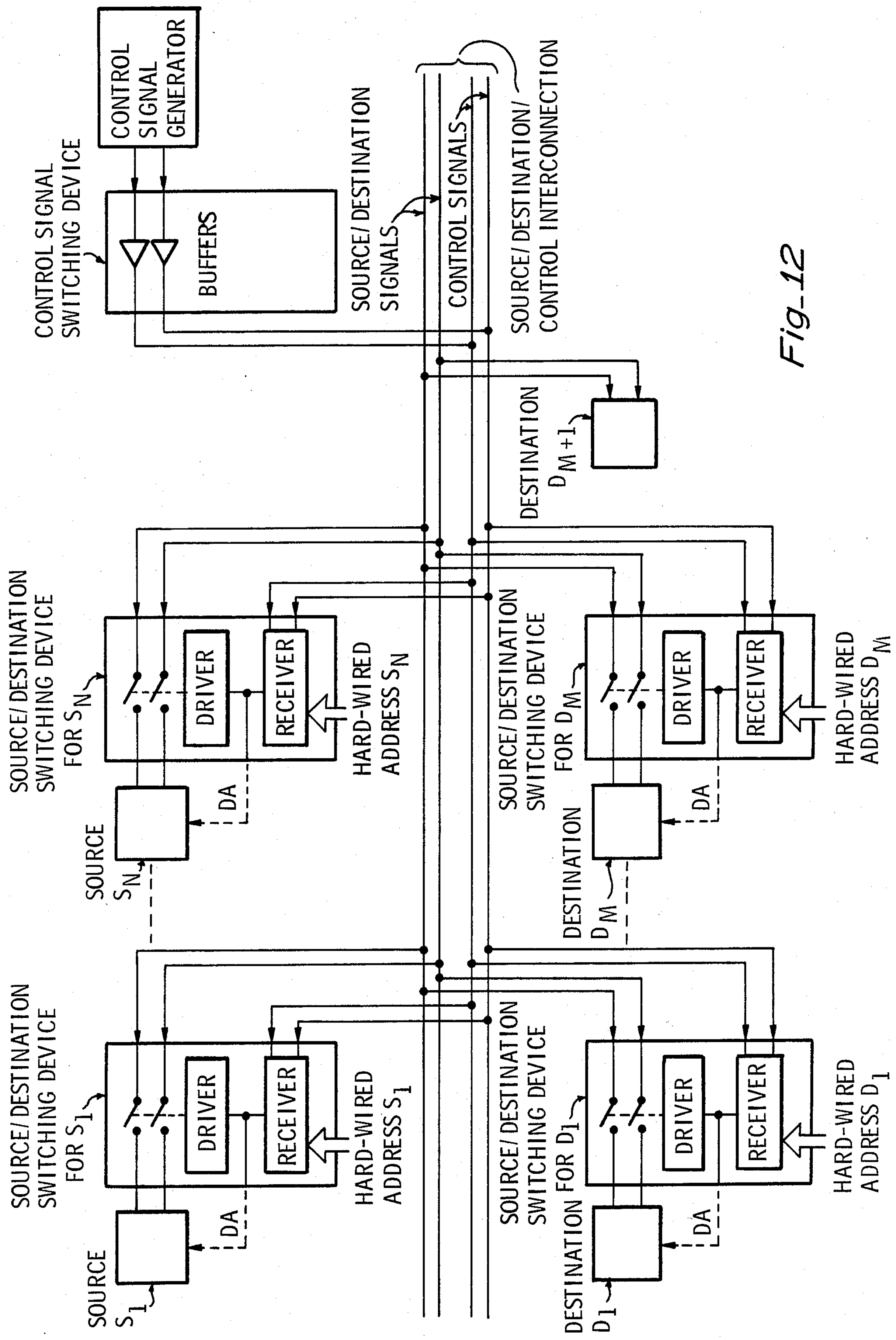
FIG. 12 illustrates a four-wire interconnection embodiment of the present invention wherein a simplified control switching device and simplified source/destination switching devices are used.

FIG. 12 illustrates a possible alternative embodiment of the invention. Here different wires of "s/d/c" interconnection serve for connecting the sources to the destinations and for connecting the control signals. In the example shown, each of the wire groups have two wires, but they can have a different number of wires, too.

The embodiment shown has the same possibilities of application as described previously. However, the "c" switching devices and the "s/d" switching devices can be made more simple. On the other hand, the "s/d/c" interconnection has more wires.

As FIG. 12 shows, the source-to-destination signals and the control signals are separated. Consequently, there is no more necessity to disconnect the control signal generator from the "s/d/c" interconnection by the use of switches and the "c" switching device now consists only of simple buffers or line drivers, as shown. The "s/d" switching devices are also more simple. There is no need anymore for the high input resistance/low input current buffers 22 and 23 at the input of the receivers, and for the resistors 16 and 17, which were previously connected in series with the switches. Otherwise, the "s/d" switching devices can be of any kind previously described.

I claim:

1. A remote data system for selectively connecting signal source to destination devices including:
   - a transmission line;
   - a source/destination switching device coupled to each of said signal source and destination devices and including transmission line connection means, switch means coupled to said transmission line connection means, pulse responsive receiver means coupled to said transmission line connection means, driver means coupled between said receiver means and said switch means, detect and decode means connected to said receiver, register means responsive to said detect and decode means, comparator means responsive to said register means and including an address comparator a general enable decoder and a reset decoder, first gate means responsive to said address comparator said general enable decoder said reset decoder and said transmission detect and decode means, first and second flip flop means adapted to be activated by said first gate means, and second gate means responsive to said first and second flip flop means coupled to activate said driver means;

a control signal generator adapted to transmit control pulses; and a control signal switching device adapted to be actuated by said control signal generator and coupling said control signal generator to said transmission line to transmit a control signal; thereby providing control means responsive to pulses from said control signal generator for enabling said source/destination switching devices to connect selected signal source and destination devices to said transmission line.

2. In the remote data system set forth in claim 1, said first gate means including:

a first "and" gate responsive to said address comparator and said transmission detect and decode means;

a second "and" gate responsive to said reset decoder and said transmission detect and decode means;

a third "and" gate responsive to said general enable decoder and said transmission detect and decode means;

a fourth "and" gate responsive to said reset decoder and said transmission detect and decode means;

said first flip-flop means responsive to said first and second "and" gates;

said second flip-flop means responsive to said third and fourth "and" gates; and said second gate means coupled to said first and second flip-flop means.

3. In the remote data system set forth in claim 2, a pulse width generator coupled between said second gate means and said driver means.

4. In the remote data system set forth in claim 1, said comparator means including:

an address comparator and a general enable decoder coupled to said register means;

first gate means coupled to said address comparator, said general enable decoder and said transmission detect and decode means;

flip-flop means coupled to said first gate means;

a pulse width generator responsive to said flip-flop means;

a mono pulse generator responsive to said pulse width generator coupled to said register and said flip-flop means; and second gate means responsive to said flip-flop means and adapted to activate said driver means.

5. A remote data system for selectively connecting transducers to a signal processor including:

transducer excitation means;

source/destination switching devices coupled to said transducers including a first source/destination switching device adapted to interconnect said transducer to said excitation means, and a second source/destination switching device adapted to interconnect said transducer to said signal processor;

control means;

a first transmission line adapted to interconnect said source/destination switching devices, a second transmission line adapted to transmit said transducer excitation means, and a third transmission line adapted to interconnect said control means; and means enabling connection of said transducer excitation means to a selected transducer prior to interconnection of said transducer to said signal processor.

6. In the remote data system set forth in claim 5, said transducer excitation means including a first excitation generator and a second excitation generator, and means enabling interconnection of one of said first and second excitation generators to excite a first transducer while the other of said excitation generators excites a second transducer and said transducers are alternately connected to said signal processor.

7. In the remote data system set forth in claim 6, said excitation generator connections being made to one transducer while the other transducer is being measured whereby the excitation transient is not present in a measurement interval.

* * * * *